Sept. 15, 1925.  
H. A. DENMIRE  
APPARATUS FOR MAKING TIRE BEADS  
Filed Oct. 6, 1922

Inventor  
Harold A. Denmire  
By A. L. Ely  
Attorney

Sept. 15, 1925.

H. A. DENMIRE

APPARATUS FOR MAKING TIRE BEADS

Filed Oct. 6, 1922

Inventor
Harold A. Denmire

By [signature]
Attorney

Sept. 15, 1925.
H. A. DENMIRE
APPARATUS FOR MAKING TIRE BEADS
Filed Oct. 6, 1922  6 Sheets-Sheet 3
1,553,514
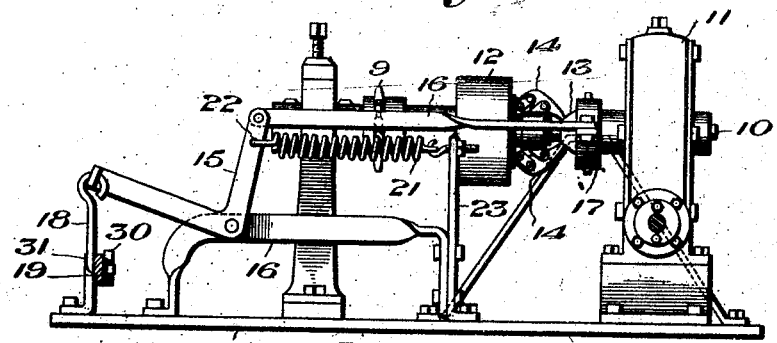
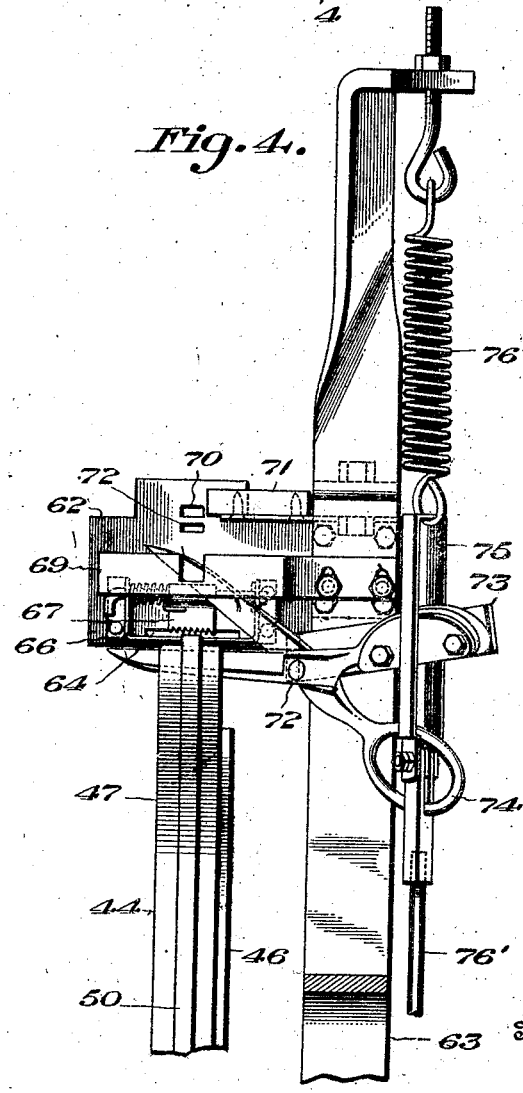
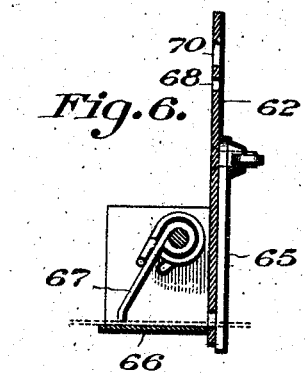
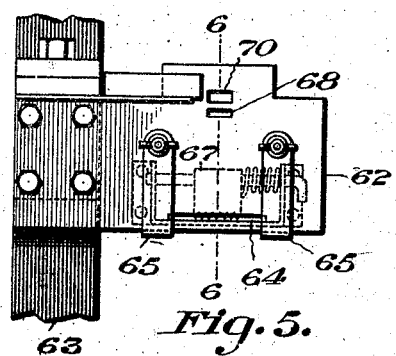
Inventor
Harold A. Denmire
By
Attorney

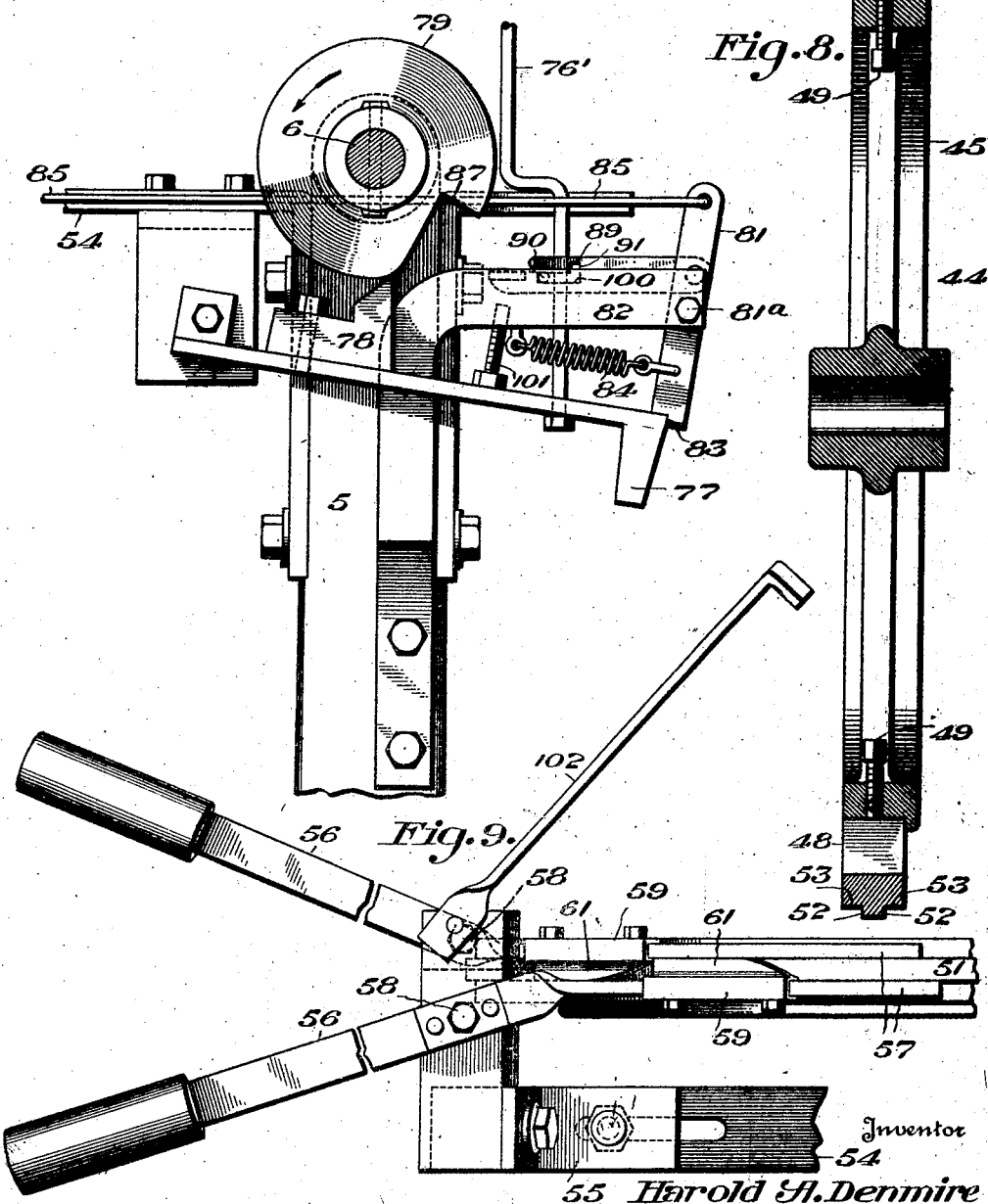

Sept. 15, 1925.  1,553,514
H. A. DENMIRE
APPARATUS FOR MAKING TIRE BEADS
Filed Oct. 6, 1922   6 Sheets-Sheet 5

Inventor
Harold A. Denmire
By
Attorney

Sept. 15, 1925.  H. A. DENMIRE  1,553,514
APPARATUS FOR MAKING TIRE BEADS
Filed Oct. 6, 1922  6 Sheets-Sheet 6

Inventor
Harold A. Denmire
By
Attorney

Patented Sept. 15, 1925.

1,553,514

UNITED STATES PATENT OFFICE.

HAROLD A. DENMIRE, OF AKRON, OHIO, ASSIGNOR TO THE GENERAL TIRE AND RUBBER COMPANY, OF AKRON, OHIO, A CORPORATION OF OHIO.

APPARATUS FOR MAKING TIRE BEADS.

Application filed October 6, 1922. Serial No. 592,778.

*To all whom it may concern:*

Be it known that I, HAROLD A. DENMIRE, a citizen of the United States, residing at Akron, county of Summit, and State of Ohio, have invented certain new and useful Improvements in Apparatus for Making Tire Beads, of which the following is a specification.

My invention relates to apparatus for making tire beads. Tire beads, of the so-called straight side variety with which my invention is particularly concerned, comprise a fabric covering strip surrounding convolutely wound strips of non-stretchable material, usually in the form of a wire tape impregnated with rubber, and a rubber filler strip. This structure is semi-vulcanized in a mold to compress it, in cross-section, into substantially triangular form. Prior to my invention, one method of constructing these beads has been to build them up on an annular form, comprising a lateral face and a vertical face. The fabric covering is stitched into the angle formed by the lateral face and the vertical face of the form, and the wire tape and the filler strip are wound upon the covering manually while the form is being rotated. The edges of the covering strip are then folded over the other strips by the operator and rolled or stitched by a hand tool. This method is extremely laborious and time consuming. It is difficult to produce sizes of beads of uniform cross-section and the covering becomes wrinkled and is pinched during the subsequent molding operation. Moreover, it is difficult to impose a uniform tension upon the tape and filler strip as they are wound about the covering, which is another factor that causes the covering to wrinkle and prevents the operator from producing beads of uniform sizes.

It is the particular purpose of the present invention to provide an apparatus whereby straight side beads of uniform sizes may be constructed expeditiously and accurately, and the number of operations reduced.

It is also the purpose of my invention to provide for effecting a uniform tension upon all the strips comprising the bead as they are positioned relatively to each other and to smooth and iron the bead structure to eradicate any unevenness in the covering.

Other objects, together with the advantages of my invention, will become apparent when the following description is read in conjunction with the drawings accompanying and forming a part of this specification.

In said drawings:

Figure 3 is a stransverse section taken on the line 3—3 of Figure 2;

Figure 4 is a transverse section taken on the line 4—4 of Figure 2, parts being shown in elevation;

Figure 5 is a rear elevational view, on an enlarged scale, of a guide and centering device forming a part of the present invention;

Figure 6 is a sectional view, on a further enlarged scale, taken on the line 6—6 of Figure 5;

Figure 7 is a fragmentary view, partly in section and partly in side elevation, of a trip mechanism forming a part of the present invention;

Figure 8 is an enlarged transverse sectional view of a form embodied in my apparatus;

Figure 9 is a detail plan view, on an enlarged scale, illustrating a portion of the form and a pair of tools which I utilize in conjunction therewith;

Figure 1:
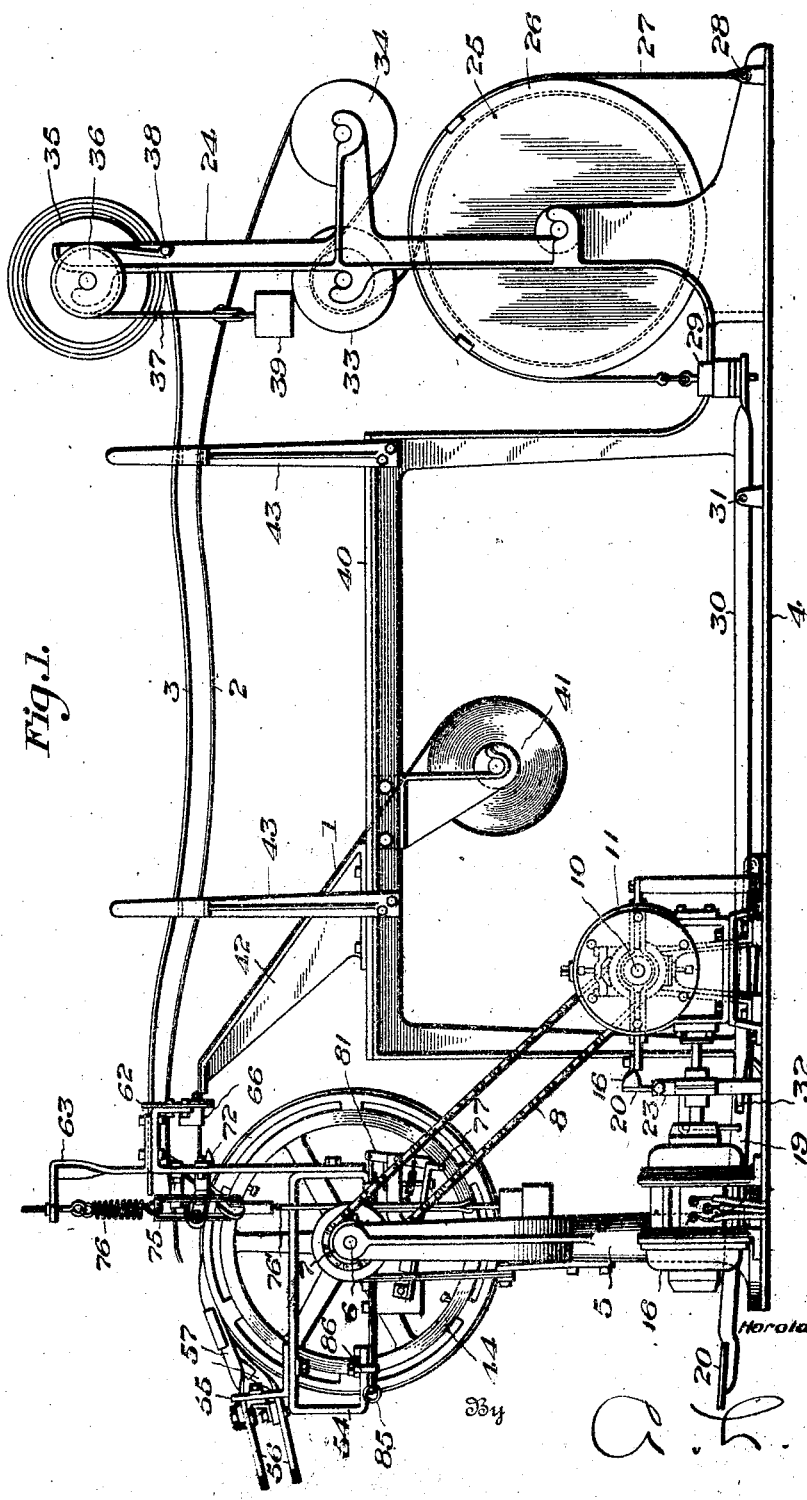
Figure 1 is a side elevational view of one form of apparatus which may be utilized in practicing my method.
Figure 2:
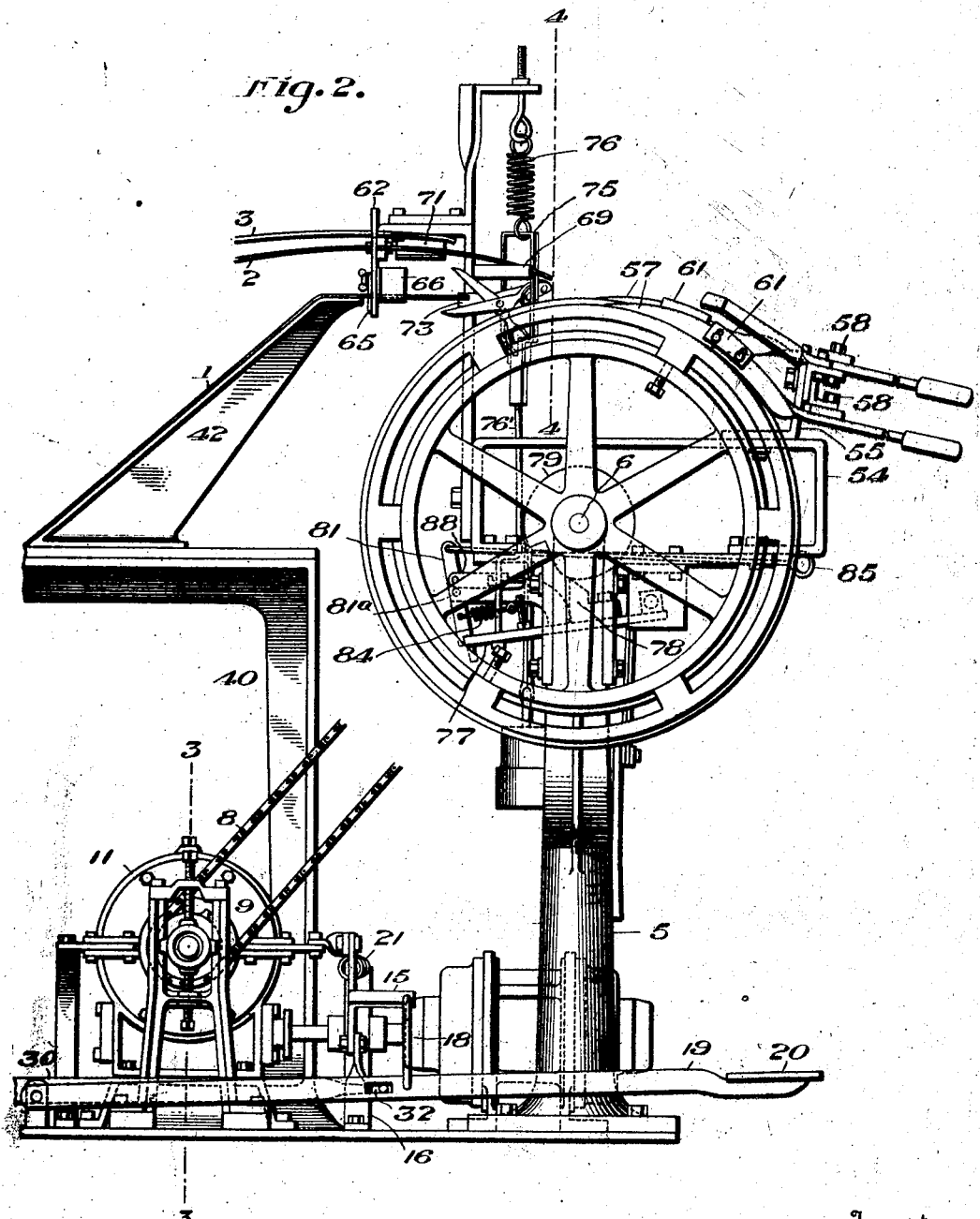
Figure 2 is a side elevational view, on a large scale, of a portion of the apparatus looking at the opposite side thereof from that shown in Figure 1.

In the operation of the apparatus herein shown for making the straight side beads, I first wind, under tension, a strip of flexible material 1, such as the usual bead covering fabric cut on the bias, into the form of an annulus, comprising, preferably, a single convolution having its ends overlapping. The annulus may be formed from a single strip, or taken from a continuous strip, and cut to the proper length, as will presently appear. I next wind a strip of wire tape 2, that is impregnated with rubber, circumferentially of the annulus while the tape is under tension and the annulus is being rotated. Preferably, I first wind two convolutions of the tape 2 about the annulus, after which I wind a third convolution of the tape 2 together with a single convolution of a ruffer filler strip 3 about the two aforesaid convolutions of tape. The structure thus formed is now rotated and the edges of the fabric strip 1 are next turned up, or folded, over the convolutions of the tape and the filler while the annulus is being rotated, to cover the latter. Simultaneously with the folding operation, I effect both a lateral and a circumferential pressure against the folded structure in such manner that the fabric is ironed out, both upon the sides and upon the outer periphery of the bead. The bead thus far formed may now be molded and vulcanized into the desired cross-sectional contour.

The apparatus which I preferably employ in practicing the method above described will now be set forth in detail.

The numeral 4 designates a base of a casting having at one end thereof, a bifurcated upright 5. At its upper end, a transverse shaft 6 is journaled in the upright 5, said shaft being provided with a sprocket wheel 7 fast thereon. The sprocket wheel 7 is driven by a chain 8 that engages a second sprocket wheel 9 upon the shaft 10 of a speed reduction device 11. The sprocket wheel 9 is carried by a clutch device 12 which may be clutched to, or released from, the shaft 10 by means of a collar 13. The collar 13 is slidable longitudinally of the shaft 10 to actuate a plurality of clutch operating dogs 14 which are carried by the clutch member 12. This form of clutch is well known and forms no particular part of the present invention. It will, therefore, not be described in further detail.

The collar 13 is moved longitudinally of the shaft 10 by means of a bell crank lever 15 that is pivoted to rock upon a bracket 16 arising from the base 4. One end of the bell crank lever 15 is connected by a bar 16 to a yoke 17 adapted to move the aforesaid collar 13 longitudinally of the shaft 10 when the bell crank lever 15 is rocked upon its pivot. The opposite end of the bell crank lever 15 is connected by a link 18 to the intermediate portion of an elongated foot treadle 19 which is pivoted at its rear end upon the casting 4. The arrangement of the clutch elements 12, 13, 14 and 17, the bell crank lever 15, the bar 16 and the treadle 19 is such that when the forward end 20 of the treadle 19 is depressed, the clutch will be actuated to lock the sprocket wheel 9 to the shaft 10 and thus rotate the shaft 6. A retractile spring 21 is connected at one end to the bell crank lever, as at 22, see Figure 3, and has its opposite end connected to an upright 23 arising from the base 4. The spring 21 serves to normally disengage the clutch element 12 from the shaft 10 and to hold the treadle 19 with its forward end in raised position.

At the rear of the casting 4, a pair of uprights 24, one of which is shown in Figure 1, are provided. Between the uprights 24, a reel 25 is journaled for rotation about an axis parallel with the shafts 6 and 10. The reel 25 is adapted to contain a roll of the wire tape 2 and is constructed to provide spaced annular side members, one of which is shown at 26. A brake band 27 is arranged about the periphery of one of the members 26, preferably in the manner shown in Figure 1, wherein one end of the band is connected, as at 28, to the casting 4, while the free end of the band is provided with a weight element 29. The weight 29 is supported upon one end of a lever 30 which is fulcrumed intermediate its ends, as at 31, upon the base member 4. The opposite end of the lever is connected for sliding engagement with the intermediate portion of the lever 19. The arrangement of the levers 30 and 19 is such that when the lever 19 is depressed to effect rotation of the shaft 6, the weight 29 is lifted to decrease the retarding effect of the band 27 upon the reel 25, so that by this means the tension upon the strip 2 is relieved as it is pulled from the reel 25. Above the reel 25, an idler roll 33 is journaled upon the uprights 24, over which the tape 2 passes as it is taken from the reel 25. Tape of the character employed in building beads is coated with rubber and therefore is tacky and is usually wound with a liner. I, therefore, provide a liner reel 34 also journaled on the uprights 24 for reeling up said liner as the tape is pulled from the reel 25. A reel 35 is journaled upon the uprights 24, as shown in Figure 1. The reel 35 is designed to contain the strip of filler material 3 and has its journal provided with a brake drum 36 over which a brake band 37 is trained. One end of the brake band 37 is suitably affixed to the standard, as at 38, while the free end of the band is provided with a weight 39. By this manner of mounting the reel 35, I effect a tension upon the filler strip 33 as it is pulled from the reel.

The casting 4 is constructed to provide a table 40 intermediate the upright 5 and the uprights 24. Upon this table, the strips of covering material 1 may be assembled into a continuous strip, if desired, but preferably I employ a reel 41 of covering material comprising a continuous strip. Reel 41 is journaled preferably beneath the table, and the material therefrom is led over an upwardly inclined guide 42 toward the upright 5. The ends of the strips 2 and 3 are likewise led through guides 43 arising from the table 40 toward the upright 5, as will be apparent from an inspection of Figure 1.

The free ends of the strips 1, 2 and 3 are designed to be wound about an annular form 44 that is fixed upon the shaft 6 for rotation therewith, which form comprises a wheel 45 having an outwardly extending flange 46. A ring or annulus 47, having radial lugs 48, is adapted to be positioned upon the wheel 45, with the lugs 48 abutting the flange 46 of said wheel. Screws 49 are provided at suitable intervals in the rim of the wheel 45 to engage the lugs 48 and hold the annulus 47 in place. The form 44 is constructed in this manner so that annuli of different thickness may be positioned thereon and different sizes of beads built up on the form. Preferably each annulus 47 is provided with a circumferential centrally located rib 50 having a transverse face 51 and vertical side faces 52. The rib 50 is approximately the width of the bead which it is desired to build, and the annulus is constructed to provide the horizontal face 53 upon each side of said rib 50 for a purpose presently apparent.

Figure 10:
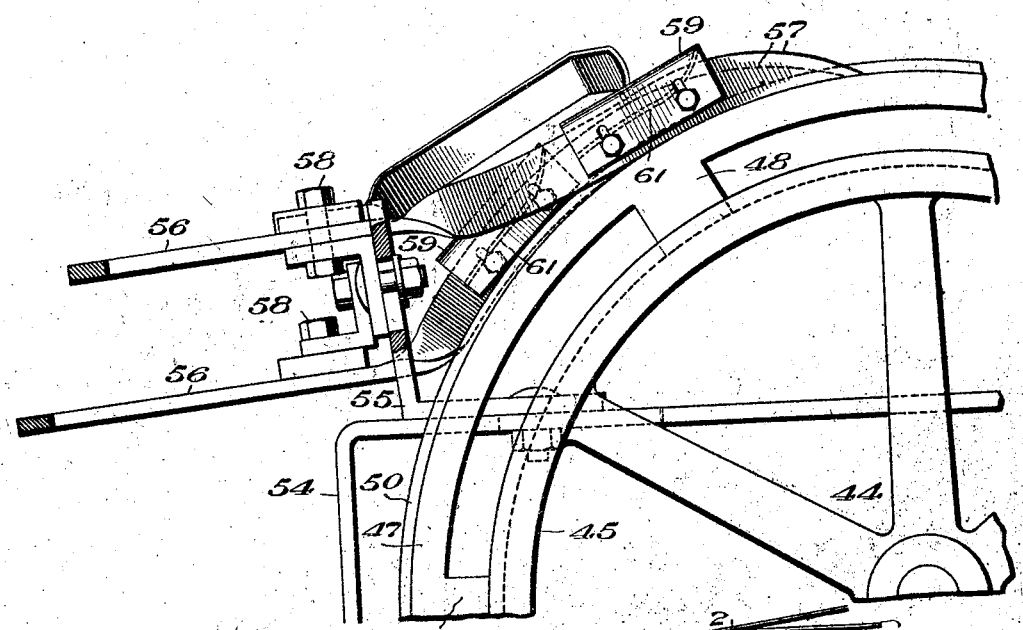
Figure 10 is a side elevational view of the parts shown in Figure 9.
Figure 13:
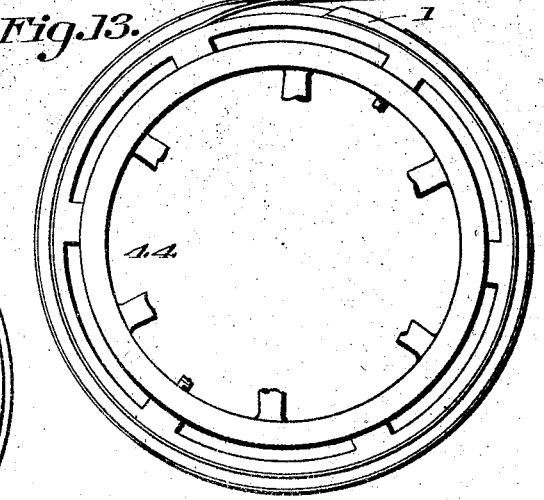
Figure 13 is a diagrammatic view further illustrating my method.

A rectangular shaped bracket 54 is suitably affixed to the standard 5 to project laterally therefrom upon each side of the shaft 6. Adjacent one end of the bracket 54, an L-shaped bracket 55 is mounted thereon for adjustment in a horizontal plane toward or away from the periphery of the form 44, as shown in Figure 9. Upon the bracket 55 a pair of tools 56 is mounted for adjustment in substantially a vertical plane. Each tool is fulcrumed, as at 58, upon the bracket 55 for movement thereon so that their forward ends may be swung laterally of the form 44. Each tool comprises a handle portion 56 and a vertical blade portion 57. The blade portion 57 of each tool has its forward end curved and the tools are mounted so that their under edges will engage the surfaces 53 of the ring 47 when said tools are swung upon their fulcrum 58 to move the blade portions toward the plane of the form 44. Preferably the forward end of each blade portion 57 is pointed and they are each provided with an ironing shoe 59, the shoes 59 being adjusted upon the blades 57 in a direction substantially radial in respect to the form 44, as shown in Figure 10. The shoes 59 comprise respectively, a vertical portion 60 by which they are adjustably fastened to the blades 57 and a laterally extending portion 61 arranged to project over the rib 50 of the ring 47. The forward end of each laterally extending portion 61 is curved for turning over and smoothing the fabric, the points of the tools acting as ploughs and being arranged one in front of the other to turn one edge of the cover and then apply the other edge thereover.

It will be noted that the blades 57 of the tools are arranged to operate to one side of the vertical center of the form 44. Upon the opposite side of the vertical center of the form 44, a vertical guide plate 62 is provided for the free ends of the strips 1, 2 and 3. This plate 62 is carried upon a support 63 that arises from the end of the bracket 54 opposite to that upon which the tools are fulcrumed. The guide 62 comprises three vertically aligned horizontal slots, the lower one, 64, of which is substantially the width of the fabric 1. The end of the strip 1 is led through the slot 64 and is aligned, or centered, relative to the form 44 by a pair of adjustable guide fingers 65, one of which is positioned upon either side of said slot and upon the rear face of the plate 62. Upon its forward face, the plate 62 is provided with a laterally extending support 66 that projects toward the periphery of the form 44. The fabric strip 1 is designed to pass over the support 66 and to have its upper face engaged by spring pressed toothed dog 67 mounted to engage the upper surface of the fabric on the support 66 and prevent it drawing back after the forward end is severed and also to act as a tension device for the fabric. Above the slot 64 a relatively narrower slot 68 is provided in the plate 62, through which the strip 2 passes. A second guide for the strip 2 is arranged in advance of the plate 62 and comprises a bar 69 that projects from the upright 63. The bar 69 is provided with a notch arranged to also center the strip relative to the form 44. Above the slot 68 a third slot 70 is provided in plate 62 to center the filler strip 3 relative to the form 44. A horizontally disposed guide 71 is arranged upon the support 63, adjacent the slot 70, to prevent side play of the strip 3.

Figure 11:
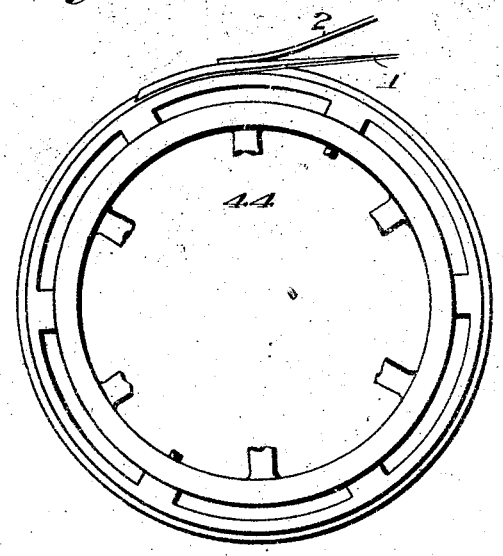
Figure 11 is a diagrammatic view illustrating the initial step of my method.
Figure 12:
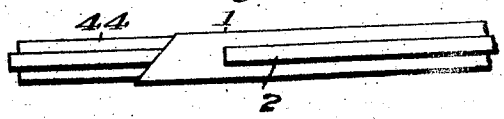
Figure 12 is a top plan view of the showing of Figure 11.

In operating the present form of apparatus, the free end of the strip 1 is first cemented to the face 51 of the rib 50 and the free end of the strip 2 is pressed upon the strip 1 at a slight distance from the extremity of the former. This operation is best illustrated in Figures 11 and 12 of the drawings. The form is now rotated once by the devices previously described, or until the strip 1 overlaps its free end portion, whereupon the strip is cut on the bias by means now to be described.

The means for cutting or severing the strip is designed to cut with a shearing action, for instance in the manner of a pair of shears. In the present embodiment of my invention, I have elected to utilize such an instrumentality, although other devices may be substituted in lieu thereof as will be apparent. The shears, designated 72 in the drawings, are arranged intermediate the guide plate 62, and the form 44, in the path of travel of the strip 1. One blade of the shears 72, preferably the lower one, is affixed, below the strip 1, to a bracket 73 that projects laterally from the support 63, as shown in Figure 4 of the drawings. The other blade of the shears projecting across and over the strip is arranged at an angle relative to the strip. The handle portion 74 of the other blade of the shears 72 is pivoted in the lower end of a vertically movable floating yoke 75 that is suspended from the upper end of the support 63 by a retractile spring 76. A vertical pull rod 76' connects the lower end of the yoke 75 to one end of a trip lever 77. The trip lever 77 is pivoted at its opposite end to the bracket 54 beneath the shaft 6 and transversely thereof, and is arranged so that its intermediate portion is directly below the shaft 6, being provided at its intermediate portion with an upstanding finger 78. A notched cam 79 is fixed upon the shaft 6 in position to engage the finger 78. The cam 79 is constructed to depress the free end of the lever 77 until the shaft 6 and form 44 have been rotated through a single cycle of movement, whereby the yoke 75 is pulled downwardly with respect to the bracket 73 and the shears 72 held in an open position. Normally the free end of the lever 77 is latched in a depressed position by means of a vertically disposed trigger 81. The trigger 81 is pivoted, as at 81ª, intermediate its length to swing above the free end of the lever 77 and upon an arm 82 that extends from the upright 5. The lower end of the trigger is notched, as at 83, to engage the free end of the lever 77. Normally the trigger is held in engaging position relative to the free end of the lever 77 by means of a retractile spring 84, one end of which is attached to the arm 82, as best shown in Figure 7 of the drawings. A horizontal pull rod 85 is connected at one end to the upper end of the trigger 81 and has its opposite end slidably mounted in a lug 86 that is affixed to the bracket 54. When it is desired to sever the strip 1 after rotation of the form 44, the operator pulls the rod to swing the notch 83 of the trigger away from the free end of the lever 77 whereupon said lever is free to swing upwardly when finger 78 engages the notch 87 of the cam 79. The shears then close and sever the strip 1 through the action of the retractile spring 76.

A latch 88 is provided for holding the trigger 81 in disengaged position relative to the lever 77. The latch 88 comprises a horizontal finger that is pivoted at one end to the trigger 81 above the pivotal point 81ª thereof. The opposite end of the latch is provided with a bayonet slot 89 which receives a pin 90 that projects laterally from the arm 82. The slot 89 is constructed with a vertical portion 91 and a horizontal portion 100. Normally when the trigger is in engaged position relative to the lever 77, the pin 90 engages the horizontal portion 100 of the slot and permits the spring 84 to hold the trigger in engaging position relative to said lever. When the trigger is moved, however, to disengage it from the lever 77, the latch falls with the vertical portion 91 of its slot engaging the pin 90 and the trigger is held in disengaged position relative to the lever 77. As the notch 87 of the cam 79 is rotated past the finger 78, the lever 77 is raised by the action of the spring 76 and an abutment 101 on said lever 77 engages the free end of the latch 88 and moves it so that the pin 90 may engage the horizontal portion 100 of the slot 89. The spring 84 is now free to move the trigger into engaging position relative to the lever 77. By this means the shears are operated only once during the building of a bead and not until the operator again releases the trigger by actuating the rod 85.

Figure 14:
Figure 14 is a fragmentary view illustrating the manner in which the first step of my method is completed.
Figure 15:
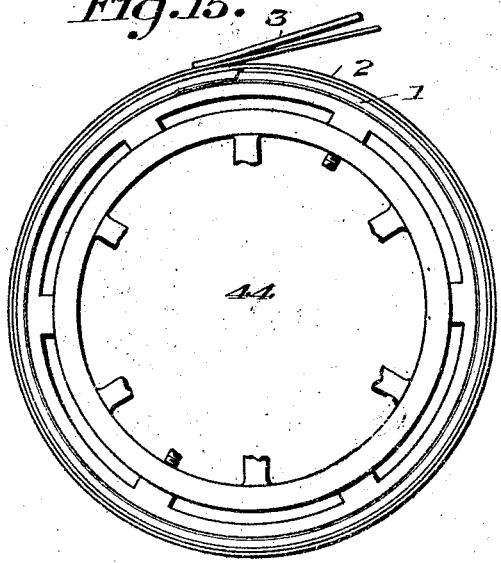
Figure 15 is a diagrammatic view illustrating the second step of my method.
Figure 16:
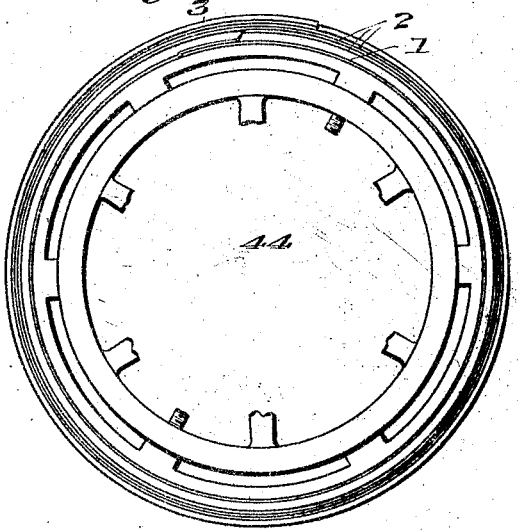
Figure 16 is a similar view illustrating the third step of my method.
Figure 17:
Figure 17 is a plan view, on an enlarged scale, of the showing of Figure 16.
Figure 18:
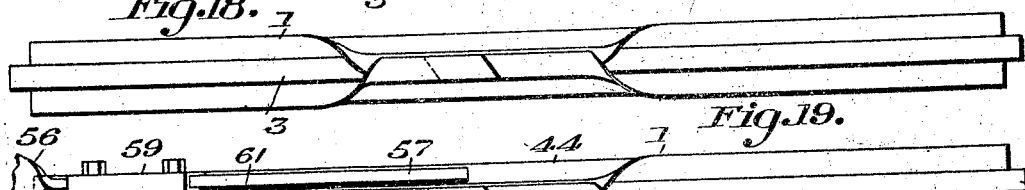
Figures 18 and 19 are plan views illustrating a fourth step of my method.
Figure 19:
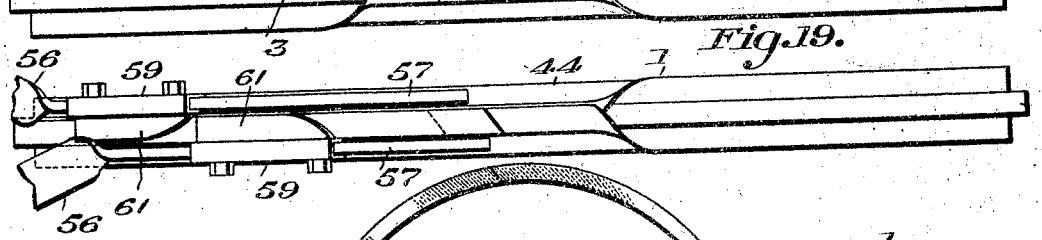
Figures 20, 21:
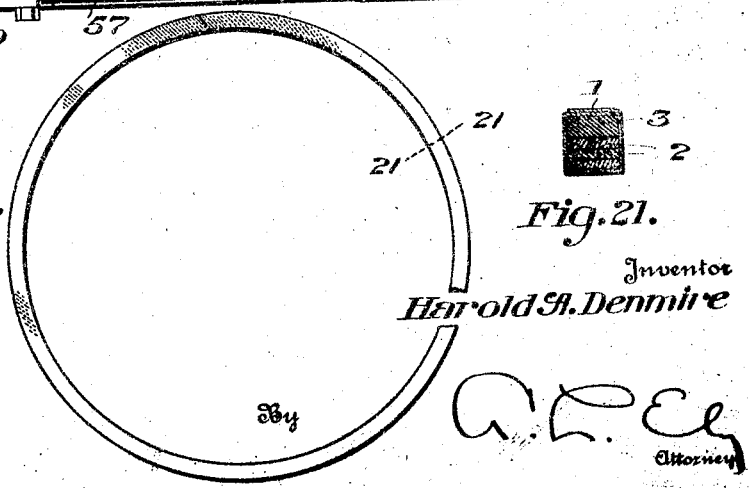
Figure 20 is a view illustrating the bead as it appears after the completion of the fourth step of my method.
Figure 21 is a transverse sectional view, on an enlarged scale, taken on the line 21—21 of Figure 20.
Figure 22:
Figure 22 is a transverse sectional view of the bead after it is given the first or partial vulcanization.

After the form 44 has been rotated once and the strip 1 has been severed and overlapped in the manner shown in Figure 14, the rotation of the form 44 may be continued the desired number of times to wind the wire tape upon the fabric cover. I then attach the free end of the strip 3, as shown in Figure 15, and revolve the form a third revolution, as shown in Figure 16, the wire and filler being cut by the operator manually. A portion of the edges of the strip 1 are next folded over the convolutions of the strips 2 and 3, to cover the same, and the tools 56 are moved about their fulcrums to position their blade portions against the sides of the folded structure. In this position of the tools, the ironing shoes 59 engage the circumferential portion of the structure. I next revolve the form a fourth revolution, whereupon the pointed ends of the tools engage beneath the unfolded edges of the strip 1 and fold them against the sides of the uncovered convolutions. At the same time the shoes 59 fold the edges of the strip 1 over the top of the uncovered convolutions and iron both the sides and circumferential portion of the structure. In other words, I progressively fold the edges of the strip 1 to cover the convolutions of the strips 2 and 3 and at the same time I simultaneously compress the covered structure, both laterally and radially, and iron it as will be apparent without further explanation. The structure is now given a partial cure and molded into the form shown in Figure 22.

By means of the construction of my novel form 44, I may substitute different sizes of annuli 47 for different sizes of beads and center them accurately relative to the axis of the form. Furthermore, the tools are mounted for adjustment in accordance with the size of the annulus used and the ironing shoes are also adjustable upon the tools in a manner to properly position them for different sizes of beads. If desired, a guard may be utilized, as shown at 102, to prevent injury to the operator from the tools when their blades are moved away from the form, but this is not essential to my invention.

It is to be understood that the present disclosure is illustrative and that changes and modifications may be resorted to without departing from the spirit of my invention or the scope of the claims appended hereto.

What I claim is:

1. Apparatus for use in constructing tire beads comprising, a plurality of reels for containing strips of material, rotatable means adapted for winding the strips from the reels into superposed convolutions, means operable to compress the convolutions both laterally and radially during rotation of said first means, and means adapted to sever one of said strips after a single convolution thereof has been wound.

2. Apparatus for use in constructing tire beads comprising, a plurality of reels for containing strips of material, rotatable means adapted for winding the strips from the reels into superposed convolutions, means operable upon rotation of said first means to compress the convolutions both laterally and radially with a circumferential ironing action, and means adapted to sever one of said strips after a single convolution thereof has been wound.

3. Apparatus for use in constructing tire beads comprising, a plurality of reels for containing strips of material, rotatable means for winding the strips from the reels into superposed convolutions, and means adapted to sever a strip after a single convolution thereof has been wound.

4. Apparatus for use in constructing tire beads comprising a plurality of sources of supply for the material of the bead, a form for receiving the strips from the supply, means for rotating the form, and a severing device operable to cut one of said strips transversely without interrupting the rotation of the form whereby an additional layer of the unsevered material may be wound about the form.

5. Apparatus for use in building tire beads comprising, a form, means for rotating the form, a plurality of sources of supply for strips of material, a clutch in the form rotating means, a retarding device for one of the sources of supply, and means connected to the clutch and to the retarding device so as to render them effective alternately.

6. Apparatus for use in constructing tire beads comprising, a plurality of reels for containing strips of material, a rotatable form for winding the strips from the reels into superposed convolutions, means which are normally inactive to sever one of said strips during rotation of the form, and means operable to render the severing means active.

7. Apparatus for use in constructing tire beads comprising, a plurality of reels for containing strips of material, rotatable means for winding the strips from the reels into superposed convolutions, normally inactive means adapted to automatically sever one of said strips during rotation of said first means, means operable to render the severing means active, and means operable to compress the convolutions both laterally and radially during rotation of said first means.

8. Apparatus for use in constructing tire beads comprising, a plurality of reels for containing strips of material, rotatable means for winding the strips from the reels into superposed convolutions, means operable to compress the convolutions both laterally and radially during rotation of said first means, individual tensioning devices for each strip, means for guiding each strip and centering it relative to said first means, means adapted to sever one of said strips after a single convolution thereof has been wound, and means for rotating said first means.

9. Apparatus for use in constructing tire beads comprising, a plurality of reels for containing strips of material, a form upon which the strips from the reels are wound into superposed convolutions, means operable to compress the convolutions both laterally and radially during rotation of said form, means for guiding and centering each strip relative to said form, means adapted to automatically sever one of said strips after a single convolution thereof has been wound, means for rotating the form, a clutch mechanism associated with said rotating means, and means operable in conjunction with the clutch mechanism for effecting a variable braking effect upon one of said reels.

10. In apparatus for constructing tire beads, a rotatable form, a pair of fulcrumed tools mounted adjacent the form and having curvilinear blade portions adapted to engage the periphery of the form, and an ironing shoe adjustably mounted upon each of said blades.

11. In apparatus for constructing tire beads, a rotatable form, a pair of fulcrumed tools mounted respectively for adjustment relative to the periphery of said form and having individual curvilinear blades adapted for engagement with the periphery of said form, and an ironing shoe mounted upon each blade for adjustment radially of the form.

12. In an apparatus for constructing tire beads, a rotatable form, a fabric folding tool mounted adjacent the form and having a blade at the side of the bead, and an ironing shoe mounted upon the blade and adapted to bear upon the top of the bead.

13. In apparatus for constructing tire beads, a support, a rotary shaft journaled therein, an annular form fast upon the shaft, means to conduct bead material to the form, a cutter element adjacent the periphery of the form and located in the path of the material, said cutter embodying a fixed member and a movable member, a spring for actuating the movable member in one direction, a cam fast upon the shaft for actuating the movable member in the opposite direction, and a manually releasable trigger mechanism adapted to render the cam and spring inoperative.

14. In apparatus for constructing tire beads, a base member, a reel at one end of the base member, a support at the opposite end of the base member, a rotary shaft journaled in the support, an annular form fast upon the shaft, a speed reducing mechanism adjacent the support having an extended shaft, a clutch operable to clutch or release the last shaft, a driving connection between the clutch and the first shaft, means for operating the clutch, and a braking device for the reel adapted to vary its braking effect thereon through operation of said last means.

15. In an apparatus for use in building beads, a form, a rib centrally located on said form, means for conducting fabric to the form and centering it with respect to the rib, means for conducting filling material to the form and centering it on the fabric over the rib, and devices for turning the overhanging edges of the fabric about the filler material and wrapping it about the filler.

16. In an apparatus for use in building beads, a rotatable annular form having an outwardly projecting rib thereon, means for conducting covering fabric to the form and centering it relative to the rib, means for conducting filling material to the form and guiding it on to the fabric, and means to engage the inner surface of the fabric at the sides of the rib and fold it over the filler material.

17. In an apparatus for use in building tire beads, a rotatable annular form, means for conducting covering fabric to the form, means for conducting filling material to the form and placing it over the fabric, and means to engage the edges of the fabric and fold it over the filling material.

18. In an apparatus for use in building tire beads, a rotatable annular form, means for conducting covering fabric to the form, means to sever the fabric after a single revolution of the form, and means to conduct filling material to the form.

19. In an apparatus for use in building tire beads, a rotatable annular form, means for conducting covering fabric to the form, means to sever the fabric after a single revolution of the form, means to render the severing means inoperative after the first revolution of the form, and means to conduct filling material to the form.

20. In an apparatus for use in building tire beads, a rotatable annular form, means for conducting covering fabric to the form, means to sever the fabric after a single revolution of the form, means to conduct filling material to the form, and means to fold the covering fabric over the filling material.

21. In an apparatus for use in building tire beads, a rotatable annular form, means for conducting covering fabric to the form, means to sever the fabric after a single revolution of the form, means to render the severing means inoperative after the first revolution of the form, means to conduct filling material to the form, and means to fold the covering fabric over the filling material.

HAROLD A. DENMIRE.